United States Patent
Liebe

(10) Patent No.: US 6,341,485 B1
(45) Date of Patent: Jan. 29, 2002

(54) GAS TURBINE COMBUSTION CHAMBER WITH IMPACT COOLING

(75) Inventor: Roland Liebe, Monheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/565,721

(22) Filed: May 5, 2000

Related U.S. Application Data

(63) Continuation of application No. PCT/DE98/03248, filed on Nov. 6, 1998, now abandoned.

(30) Foreign Application Priority Data

Nov. 19, 1997 (DE) .......................... 197 51 299

(51) Int. Cl.⁷ ................................ F02C 7/18
(52) U.S. Cl. .................. 60/39.02; 60/39.31; 60/39.32; 60/760
(58) Field of Search .............. 60/39.02, 39.32, 60/752, 760, 39.31, 39.05, 39.55

(56) References Cited

U.S. PATENT DOCUMENTS

| | | | |
|---|---|---|---|
| 2,620,626 A | * 12/1952 | Lyshlom ................ 60/39.2 |
| 3,359,723 A | * 12/1967 | Bohensky ............... 60/39.05 |
| 3,826,080 A | * 7/1974 | De Corso ............... 60/39.55 |
| 4,446,693 A | 5/1984 | Pidcock et al. .......... 60/39.32 |
| 4,550,562 A | 11/1985 | Rice .................... 60/39.02 |
| 4,819,438 A | 4/1989 | Schultz ................. 60/730 |
| 5,083,422 A | 1/1992 | Vogt .................... 60/39.02 |
| 5,388,412 A | 2/1995 | Schulte-Werning et al. .. 60/760 |
| 5,467,815 A | 11/1995 | Haumann et al. ......... 165/109.1 |
| 5,581,994 A | 12/1996 | Reiss et al. ............ 60/39.02 |
| 5,749,229 A | * 5/1998 | Abuaf .................. 60/752 |
| 5,802,841 A | 9/1998 | Maeda .................. 60/39.07 |
| 6,085,515 A | * 7/2000 | Walz ................... 60/39.32 |

FOREIGN PATENT DOCUMENTS

| | | |
|---|---|---|
| EP | 0344877 | 12/1989 |
| EP | 0589520 | 3/1994 |
| JP | 9209778 | 8/1997 |

OTHER PUBLICATIONS

Internationalen Recherchenberichts (International Search Report) in PCT/DE98/03248, Apr. 12, 1999.
Internationalen Vorläufigen Prüfungsberichts (International Preliminary Examination Report) in PCT/DE98/03248, Sep. 9, 1999.

\* cited by examiner

*Primary Examiner*—Charles G. Freay
*Assistant Examiner*—Ehud Gartenberg
(74) *Attorney, Agent, or Firm*—David M. Quinlan, P.C.

(57) ABSTRACT

A combustion chamber has an outer wall for mechanically supporting the combustion chamber and an inner wall forming an internal space through which combustion gases flow from a chamber inlet to a chamber outlet. An envelope is defined between the inner and outer walls and an intermediate wall divides the envelope into inner and outer cooling spaces. The cooling steam enters the outer space and exits the inner space, and the intermediate wall has a plurality of orifices through which cooling steam passes for impact cooling the inside of the inner wall. The inner wall is imperforate so that the cooling steam does not enter the internal combustion chamber space. The cooling steam flow in accordance with the invention increases cooling efficiency.

20 Claims, 7 Drawing Sheets

GAS TURBINE COMBUSTION CHAMBER WITH IMPACT COOLING

CROSS-REFERENCE TO RELATED APPLICATIONS

This application is a continuation of International Application PCT/DE98/03248, with an international filing date of Nov. 6, 1998, now abandoned.

BACKGROUND OF THE INVENTION

1. Field of the Invention

The present invention relates to a combustion chamber for a gas turbine and, more particularly, to impact cooling a combustion chamber with a multi-walled construction.

2. Description of Related Art

One of the most demanding thermal environments in a gas turbine is the combustion chamber where fuel is burned. The extremely high temperatures achieved in the combustion chamber require special measures for cooling the chamber walls.

U.S. Pat. No. 5,083,422 describes a aircraft engine gas turbine having a combustion chamber with a combustion zone including an internal space for guiding the hot combustion gases. The internal space at its upstream end directly adjacent to a burner is surrounded by an inner wall. In that vicinity the inner wall is of a non-perforated configuration, that is, impermeable to air and is surrounded by a casing with three rows of holes for the inflow of cooling fluid. Most of the compressed air from a compressor goes to the burner, but a small part is introduced to a side of the inner wall facing away from the internal space, where some of the air passes through the holes in the casing to form a plurality of cooling-air jets that impinge on the inner wall. The cooling air entering through the holes in the casing is then guided directly into the internal space, where the now-heated cooling air mixes with the combustion gases.

U.S. Pat. No. 4,550,562 discloses using steam to cool gas turbine parts. The combustion chamber has combined air and steam cooling using an open-air cooling circuit in which cooling air flows around the combustion chamber and is supplied to the hot gases flowing within the latter. Cooling steam is conducted in a closed circuit through pipes disposed around the combustion chamber to form its inner wall.

U.S. Pat. No. 4,819,438 discloses a gas turbine combustion chamber with convective cooling using steam. The combustion chamber has a wall enclosing an internal space that guides the hot combustion gases. The wall structure includes an inner wall exposed to the hot gases and an outer wall that forms a space between the outer and inner walls. The space has an inlet and an outlet for cooling steam, and formed therein are spiral paths through which cooling steam flowing into the space is guided.

However, those skilled in the art still seek a better system for cooling gas turbine combustion chambers.

SUMMARY OF THE INVENTION

It is an object of the present invention to avoid the shortcomings of prior art structure for cooling gas turbine combustion chambers, and particularly to provide a multi-walled combustion chamber with impact cooling.

It is another object of the present invention to provide a combustion chamber having a wall structure capable of being cooled by cooling steam, as well as a method for steam cooling such a combustion chamber.

In furtherance of the objects of the present invention, one aspect of the invention involves a combustion chamber comprising a wall structure having an outer wall for mechanically supporting the combustion chamber and an inner wall forming an internal space through which combustion gases flow from a chamber inlet to a chamber outlet, the inner wall and the outer wall defining an envelope therebetween, an intermediate wall disposed in the envelope and defining an inner cooling space between the inner wall and the intermediate wall and an outer cooling space between the intermediate wall and the outer wall, and a cooling fluid inlet in the outer space and a cooling fluid outlet in the inner space, wherein the intermediate wall has a plurality of orifices for permitting the flow of cooling fluid therethrough for impact cooling the inner wall.

A more specific aspect of the invention involves such a combustion chamber wherein the outer cooling space has an outer cooling space cross-sectional flow area that is variable along a direction of flow of cooling fluid, the outer cooling space cross-sectional flow area being in a substantially constant first ratio to the sum the areas of all of the orifices downstream of a given outer cooling space cross-sectional location, and the inner cooling space has an inner cooling space cross-sectional flow area that is variable along a direction of flow of cooling fluid, the inner cooling space cross-sectional area being in a substantially constant second ratio to the sum the areas of all of the orifices upstream of a given inner cooling space cross-sectional location, and the first and second ratios are substantially the same.

Another aspect of the invention relates to a method for steam cooling a combustion chamber having an inner wall for exposure on one side thereof to combustion gases, the method comprising the steps of providing an intermediate wall between the inner wall and an outer wall, the intermediate wall having therein a plurality of orifices, and passing cooling steam through the orifices and impacting the steam against another side of inner wall facing away from the combustion gases.

BRIEF DESCRIPTION OF THE DRAWINGS

Exemplary embodiments of the invention are explained in more detail with reference to the accompanying figures, in which.

In the drawings, the same components are given the same reference numbers or letters in the different figures. It will be understood that the drawings illustrate exemplary embodi-

DETAILED DESCRIPTION OF PREFERRED EMBODIMENTS

Figure 1:
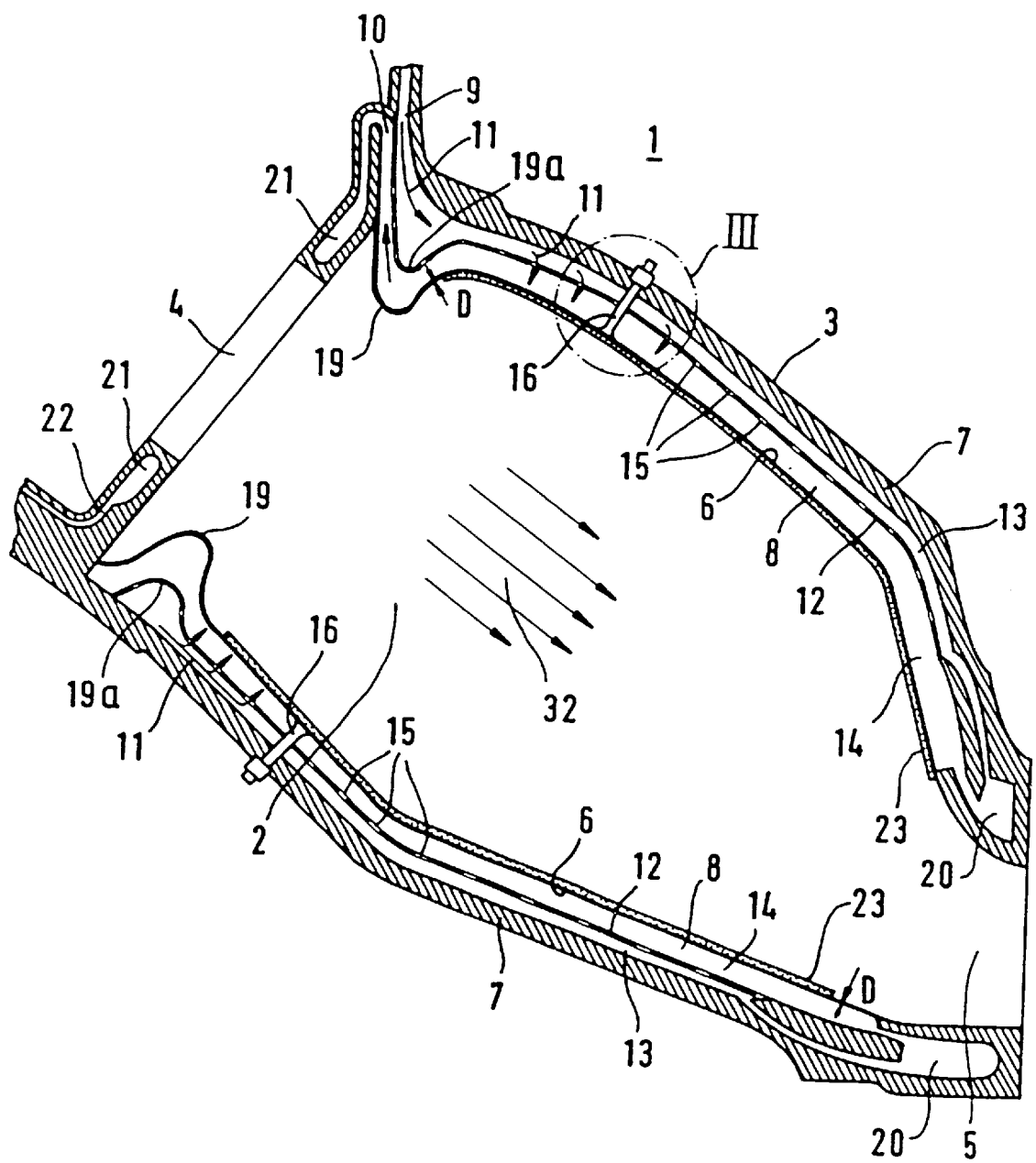
FIG. 1 is a sectional view taken along the longitudinal axis of a gas turbine combustion chamber in accordance with a first embodiment of the present invention.

Referring to FIG. 1, a combustion chamber 1 of a gas turbine (not shown) has a wall structure 3 defining an internal space 2 for guiding hot combustion gases 32 from a chamber inlet 4 to and a chamber outlet 5.

The wall structure 3 has an inner wall 6 that defines the internal space 2, and an outer wall 7 that encloses the inner wall and provides mechanical support for the combustion chamber 1. An envelope 8 is thus defined between the inner wall 6 and the outer wall 7, and an intermediate wall 12 divides the envelope 8 into an outer cooling space 13 and an inner cooling space 14. The intermediate wall 12 has a plurality of orifices 15, the purpose of which is described in detail below. A fluid inlet 9 for cooling steam 11 leads into the outer cooling space 13 and a fluid outlet 10 for the cooling steam 11 leads from the inner cooling space 14. The fluid inlet 9 and the fluid outlet 10 are arranged in the region of the combustion chamber inlet 4.

The inner wall 6 and the intermediate wall 12 are mounted elastically on the outer wall 7 by fastenings such as hangers 16. For the sake of clarity, only two hangers 16 are illustrated in FIG. 1. Those skilled in the art will appreciate that a sufficient number of hangers 16 are used to adequately support the inner and intermediate walls. The number and placement of the hangers will be readily determined by conventional mechanical engineering principles. Bent regions 19 and 19a in the vicinity of the chamber inlet 4 absorb thermomechanical deformations of the inner wall 6 and the intermediate wall 12, respectively. The inner wall 6 has a thickness D of between 4.0 mm and 8.0 mm and includes a heat-insulating layer 23 facing the internal space 2.

The wall structure 3 further includes a cavity 20 that surrounds the combustion chamber outlet 5. The cavity 20 is in fluid communication with the outer cooling space 13 and the inner cooling space 14. The wall structure 3 also has a cavity 21 that surrounds the chamber inlet 4. The cavity 21 is in fluid communication with the inner cooling space 14 and has an outlet 22 for the cooling steam 11.

In operation under load, the combustion chamber inner wall 6 is cooled by cooling steam 11 that is introduced into the outer cooling space 13 via the inlet 9 and spills over through the orifices 15 into the inner cooling space 14, where it impacts against the inner wall 6. The cooling steam 11 that spills over into the inner cooling space 14 is discharged from the outlet 10. The inner wall 6 is cooled convectively by the discharge of heat to the cooling steam 11 that flows past the inner wall.

Additional impact cooling is achieved by the cooling steam 11 impacting against the inner wall 6. As a result of arranging the inlet 9 and the outlet 10 in the region of the chamber inlet 4, the heated cooling steam 11b (see FIG. 3) that spills over into the inner cooling space 14, flows in countercurrent to the hot gases 32 flowing in the internal space 2 toward the chamber outlet 5 and in countercurrent to the cold cooling steam 11a (see FIG. 3) guided in the outer cooling space 13. One advantage of this guidance of the cooling steam is that the temperature difference between the heated cooling steam 11b (see FIG. 3) and the hot gases 32 along the inner wall 6 is reduced, thus leading to lower thermomechanical loads on the inner wall 6. At the same time, the inner wall 6 is cooled uniformly and effectively.

Furthermore, part of the cooling steam 11a (see FIG. 3) entering the outer cooling space 13 is conducted into the cavity 20, with the result that the wall structure 3 is cooled in the region of the chamber outlet 5. The cold cooling steam 11a is discharged from the cavity 20 into the inner cooling space 14. The heated cooling steam 11b (see FIG. 3) guided in the inner cooling space 14 is thence conducted into the cavity 21 at the chamber inlet 4. The wall structure 3 is thereby cooled in the region of the inlet 4. The heated cooling steam 11b is discharged from the cavity 21 via the outlet 22. Since the cavity 20 and the cavity 21 are both an integral part of the wall structure 3, the cooling steam is guided through the wall structure in such a way that low frictional losses and therefore low steam-flow pressure losses occur.

The bent regions 19 and 19a of the inner wall 6 and of the intermediate wall 12, respectively, allow for thermomechanical deformation, thereby avoiding inadmissible stresses on the inner wall 6 and the intermediate wall 12.

Figure 2:
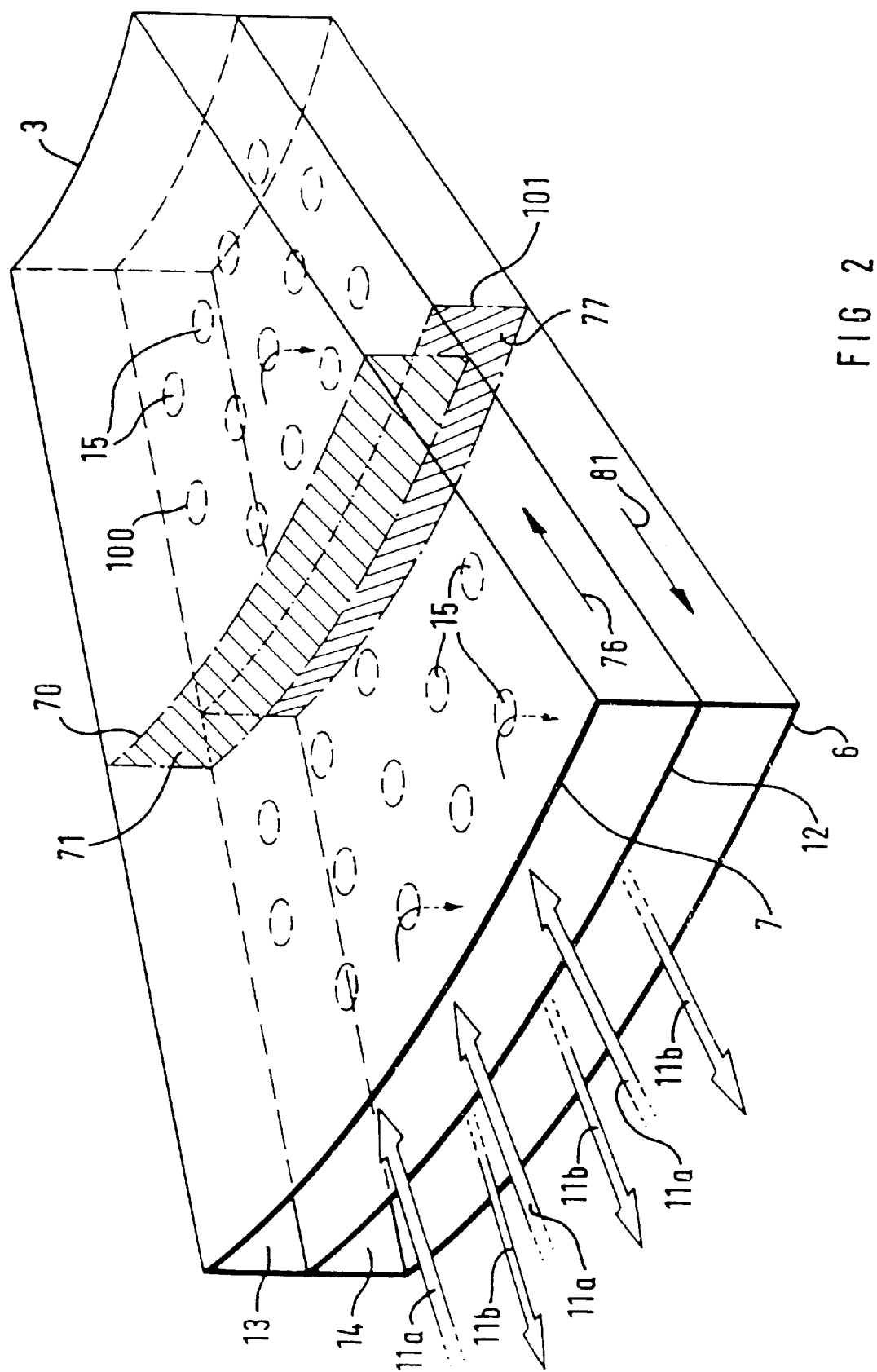
FIG. 2 is a schematic representation of the flow spaces formed by the wall structure of the combustion chamber shown in FIG. 1.

FIG. 2 illustrates an important feature of the invention embodied in the configuration of the wall structure 3. As noted above, the intermediate wall 12 between the inner and outer walls 6 and 7 includes orifices for effecting impact cooling. The orifices 15 are disposed in a uniformly distributed manner, only a few of the orifices being shown for the sake of greater clarity. In the outer cooling space 13, cold cooling steam 11a flows in an outer flow direction 76. The cold cooling steam 11a (see also FIG. 3) spills over through the orifices 15 into the inner cooling space 14 and is discharged as heated cooling steam 11b (see also FIG. 3) in an inner flow direction 81.

The outer cooling space 13 has an outer cooling space cross-section location 70 defining a variable outer cross-sectional flow area 71 essentially perpendicular to the outer flow direction 76. The variable outer cross-sectional flow area 71 is in a substantially constant first ratio to the sum of the areas 100 of all of the orifices 15 downstream of a given outer cooling space cross-section location 70. The outer cross-sectional flow area 71 decreases in the outer flow direction 76.

In a similar manner, the inner cooling space 14 has an inner cooling space cross-section location 101 with a variable inner cross-sectional flow area 77 essentially perpendicular to the inner flow direction 81. The variable inner cross-sectional flow area 77 is in a substantially constant second ratio to the sum of all of the areas 100 of all of the orifices 15 upstream of a given inner cooling space cross-section location 101. The inner cross-sectional flow area 77 increases in the inner flow direction 81.

The outer cooling space 13 and the inner cooling space 14 are configured in such a way that the first and the second ratios are virtually identical, being about 0.08. This ensures that the heated cooling steam 11b flowing in the inner cooling space 14 and the cold cooling steam 11a flowing in the outer cooling space 13 flow in each case with a uniform velocity distribution. A cooling steam flow with a uniform velocity distribution enables heat to be discharged from the inner wall with a high heat flow density of between 500 $kW/m^2$ and 900 $kW/m^2$, with the result that the inner wall can be cooled effectively.

Figure 3:
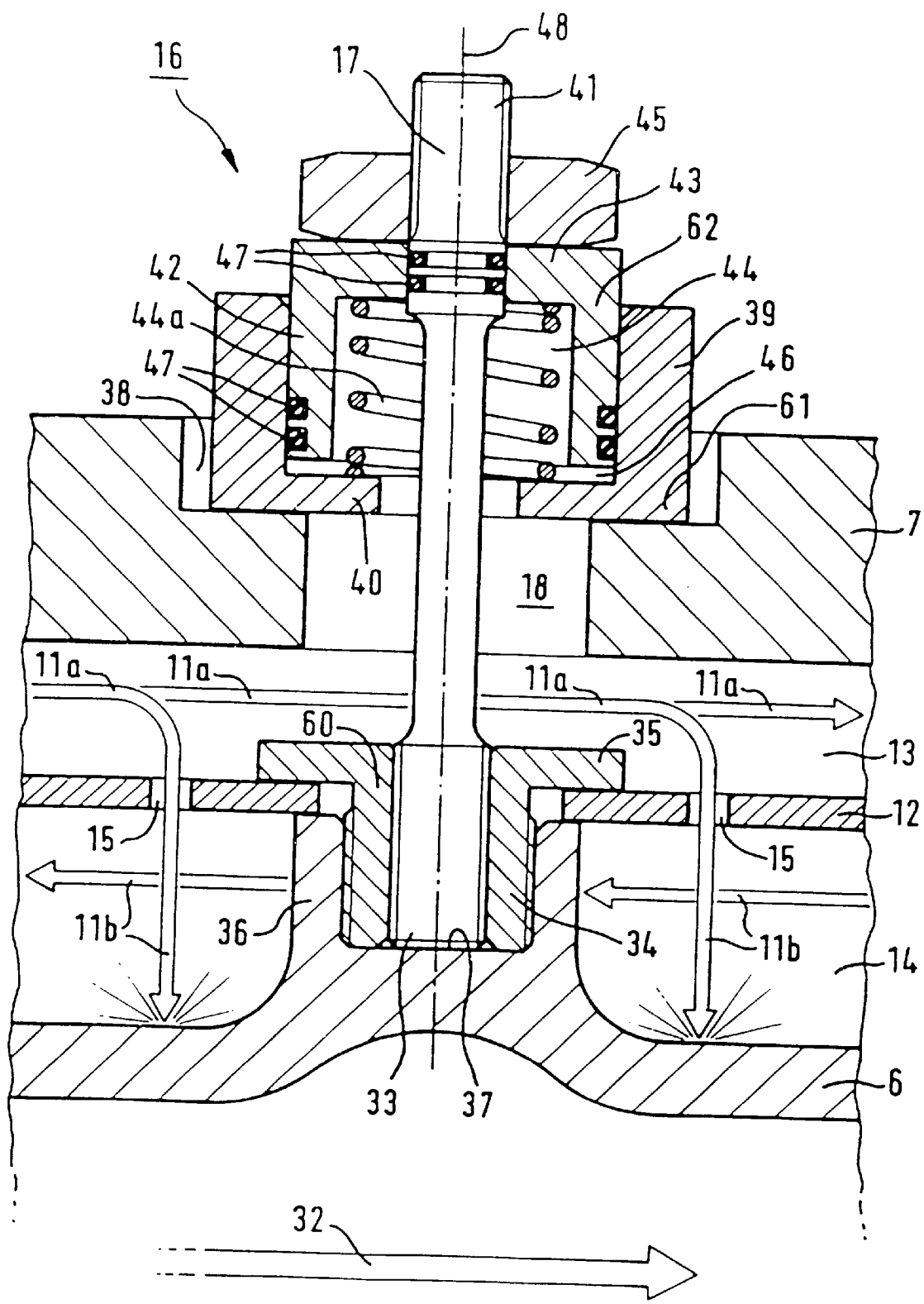
FIG. 3 is a detailed view of the portion III of the wall structure of the combustion chamber shown in FIG. 1.

FIG. 3 is an enlarged, detail view of one of the fastening hangers 16 shown in FIG. 1. A bolt 17 passes through an opening 18 in the outer wall 7. A tubular inner sleeve 34 having an annular flange 35 is mounted on the inner end 33 of the bolt 17. The sleeve 34 and the inner end 33 of the bolt 17 may be threaded to permit the bolt end 33 to be screwed into the inner sleeve 34. The annular flange 35 is disposed on the end 60 of the tubular sleeve 34 that points towards the outer cooling space 13. The inner wall 6 includes a boss 36 with a blind hole 37 opening into the inner cooling space 14. The tubular inner sleeve 34 is fastened rigidly in the blind hole 37, so that the intermediate wall 12 is held rigidly between the boss 36 and annular flange 35. The inner sleeve 34 and the blind hole may be threaded to permit the sleeve to be screwed into the blind hole 37.

The outer wall 7 has on its outer surface a counterbore 38 surrounding the opening 18. A tubular bearing sleeve 39 is inserted into the counterbore 38 and is fastened to the outer wall 7 in a suitable manner, as by welding. At its inner end 61 pointing towards the outer cooling space 13, the bearing sleeve 39 has an annular flange 40 pointing towards the main axis 48. A tubular locating sleeve 42 having an annular flange 43 pointing towards the main axis 48 is arranged at the outer end 41 of the bolt 17. The annular flange 43 is disposed at the outer end 62 of the tubular locating sleeve 42. The annular flange 43 closely surrounds the bolt 17, but permits relative displacement of the flange and the bolt parallel to the main axis 48. The tubular locating sleeve 42 is fitted into the tubular bearing sleeve 39 so as to be displaceable relative thereto parallel to the main axis 48, with a spring space 44 formed around the bolt 17 between the flanges 40 and 43.

A helical spring 44a disposed in the spring space 44 surrounds the bolt 17. One end of the spring 44a rests on the flange 40 and the other end rests on the annular flange 43. The locating sleeve 42 is fixed on one side, by means of a setting element, in this case a nut 45 threaded onto the outer end 41 of the bolt 17 in such a way that a spring interspace 46 remains between the annular flange 40 and the tubular locating sleeve 42. Consequently, the spring 44a can be prestressed when the combustion chamber is assembled. Steam gaskets 47 are mounted between the flange 43 and the bolt 17 and between the sleeves 39 and 42 to provide steam-tight seal between the respective mating parts.

Thus, the inner wall 6 and the intermediate wall 12 are fastened elastically to the outer wall 7 and are movable, in particular in the directions parallel to the bolt axis 48, over a length capable of being set by adjusting the setting element 45. The gaskets 47 prevent cooling steam from escaping the outer cooling space 13 through the opening 18.

Figure 4:
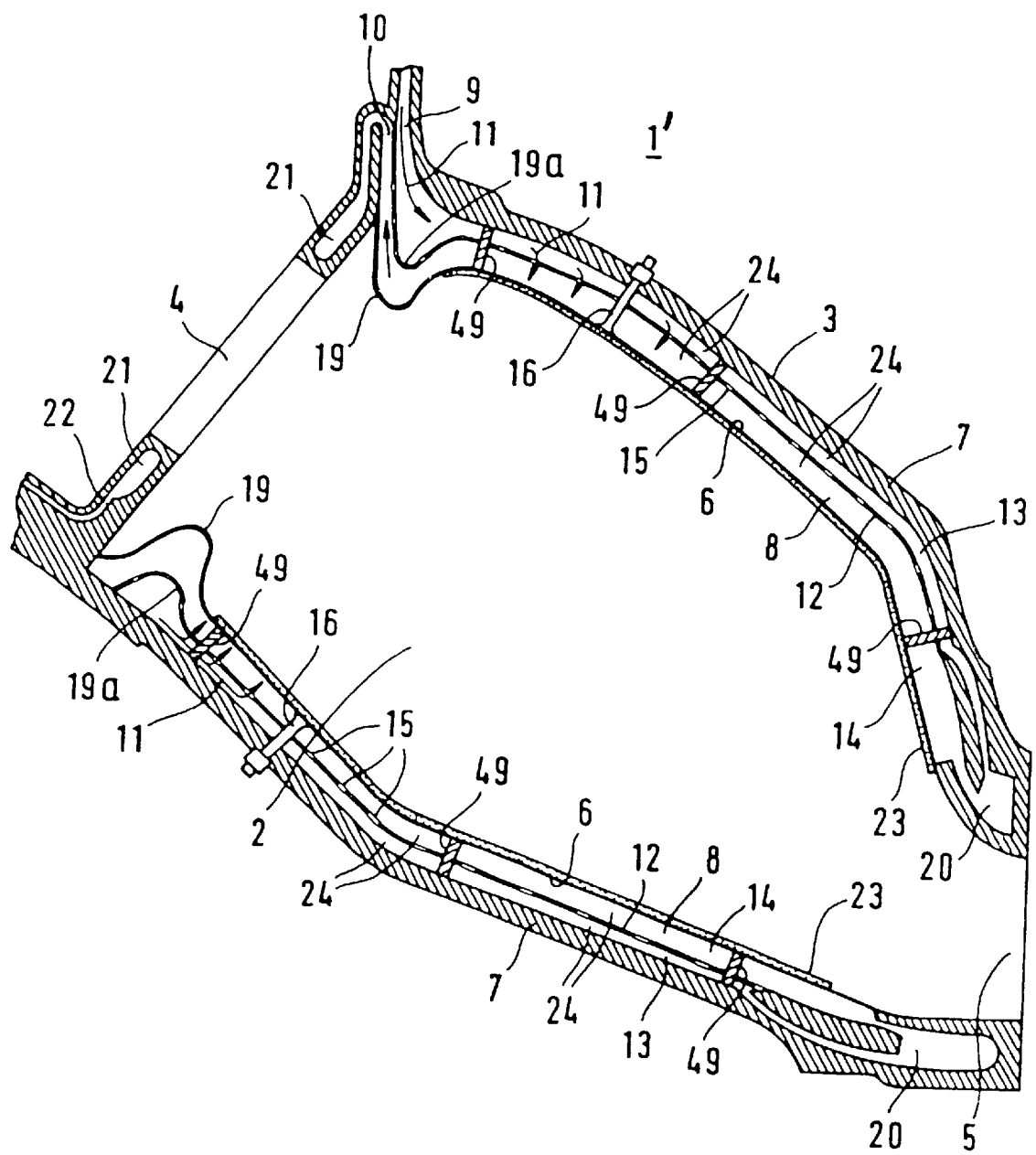
FIG. 4 is a sectional view taken along the longitudinal axis of a gas turbine combustion chamber in accordance with another embodiment of the present invention.

FIG. 4 illustrates a combustion chamber 1' in accordance with an alternate embodiment of the invention. The chamber 1' includes the features of the combustion chamber 1 depicted in FIG. 1, with added elastic webs 49 disposed in the outer and inner cooling spaces 13 and 14 between the outer wall 7 and intermediate wall 12 and between the intermediate wall 12 and inner wall 6, respectively.

Figure 5:
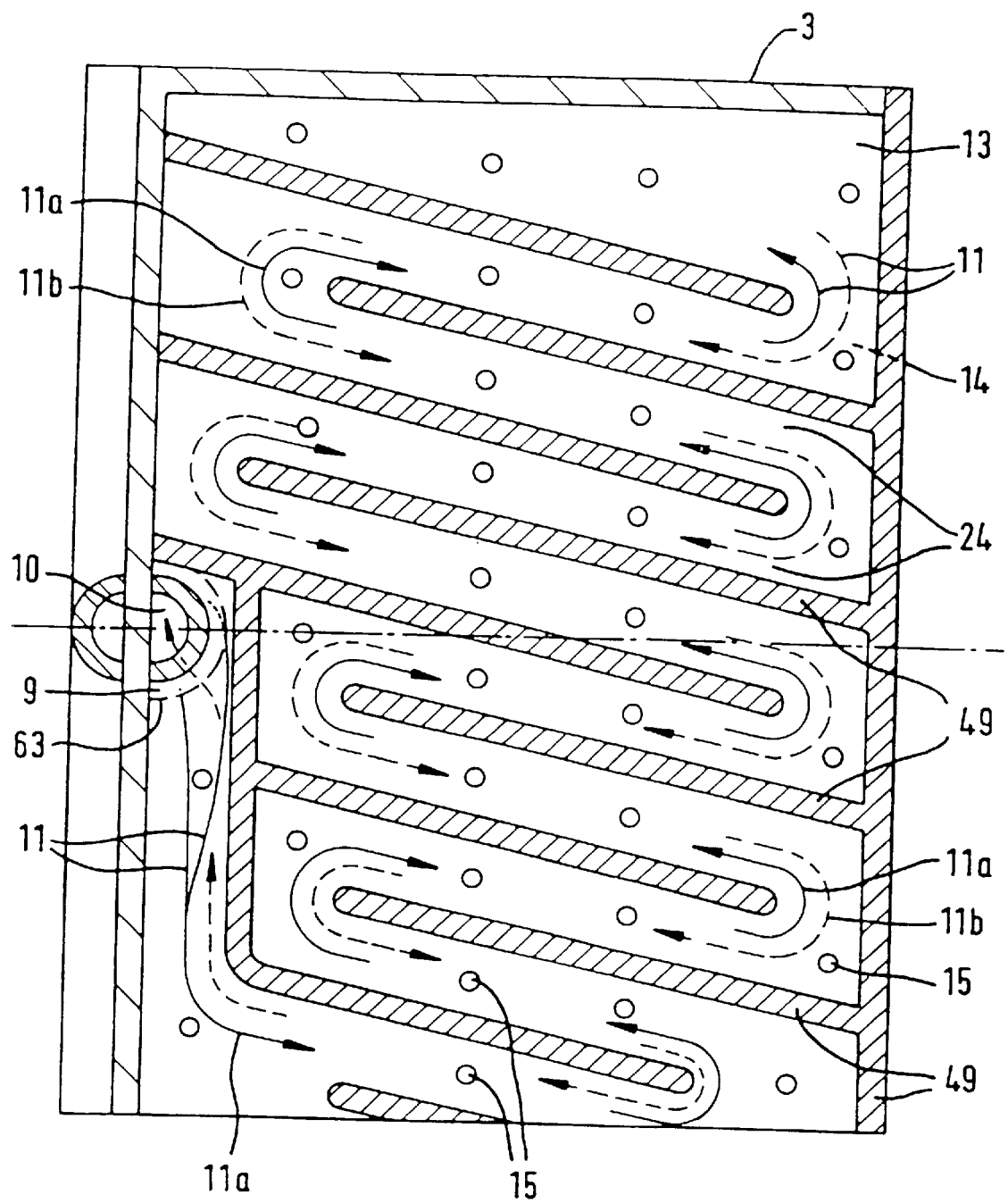
FIG. 5 is a top view of a developed sectional plane through the wall structure of the combustion chamber shown in FIG. 3.

As best seen in FIG. 5, the webs 49 form a serpentine-like flow path 24. FIG. 5 depicts a developed view of the wall structure 3, in a sectional plane parallel to the outer and intermediate walls, showing the configuration of the webs 49 and the flow path 24 in the outer cooling space 13. The placement of the webs 49 provides a serpentine flow path 24. To cool the combustion chamber 1', cooling steam 11 passes via the inlet 9 (indicated by broken lines 63) into the outer cooling space 13 and flows along the serpentine-like path 24. At the same time, it spills over through the orifices 15 into the inner cooling space 14 and flows in the direction of the outlet 10 along a corresponding serpentine-like path 24 formed in the inner cooling space 14 by the webs 49. The cold cooling steam 11a flowing in the outer cooling space 13 is illustrated by solid arrows, and the heated cooling steam 11b flowing in the inner cooling space 14 is illustrated by dashed arrows. The cold cooling steam 11a flows in countercurrent to the heated cooling steam 11b, as explained above. As a result, better distribution of the cooling steam 11a is achieved and heat exchange between the inner wall 6 and cooling steam 11b is improved.

Figure 6:
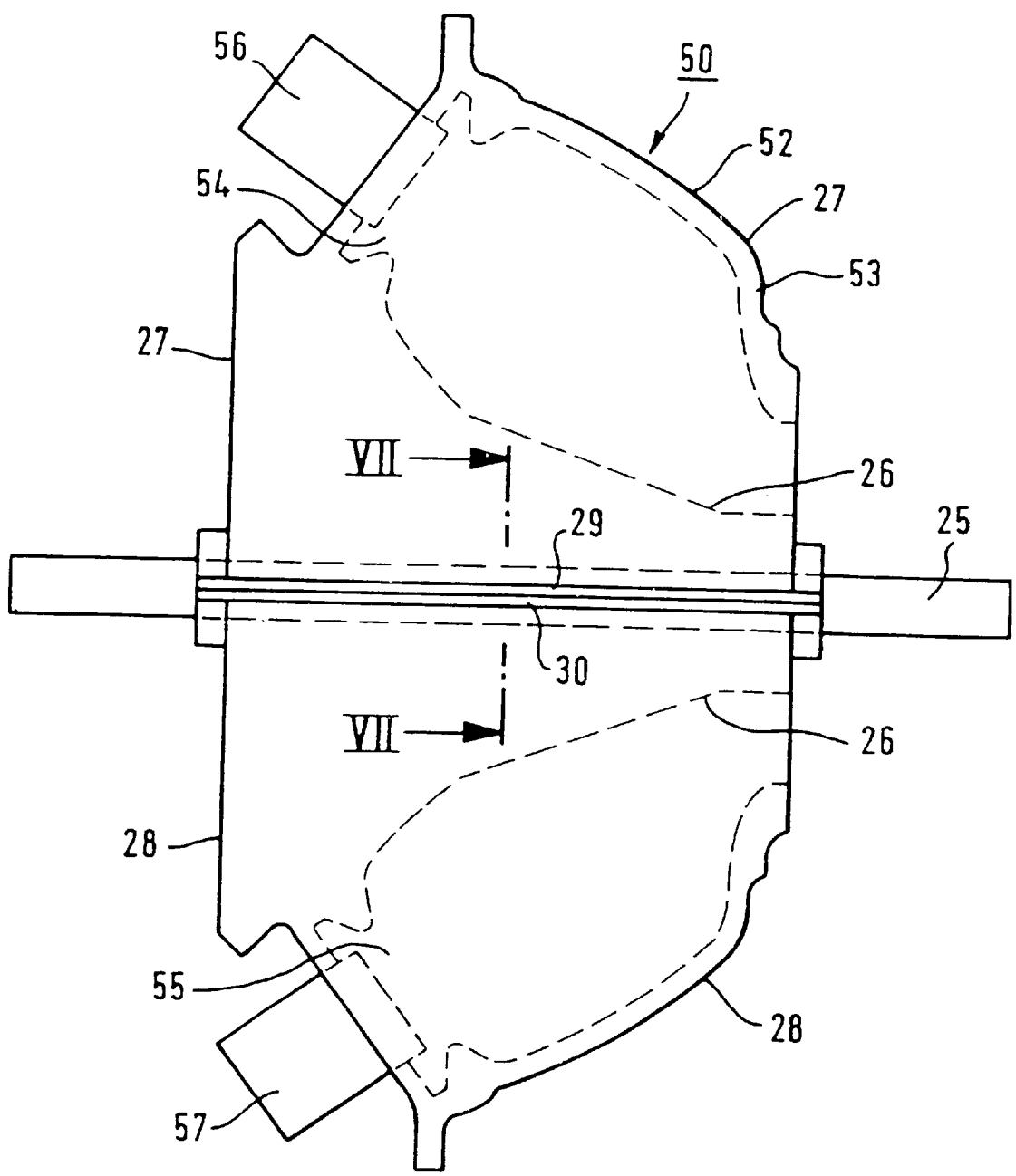
FIG. 6 is a side view of an annular gas turbine combustion chamber in accordance with yet another embodiment of the present invention.

FIG. 6 illustrates a side view of an annular combustion chamber 50 of a gas turbine. The wall structure 52 of the annular combustion chamber 50 substantially corresponds, in its construction, to the wall structure 3 of the combustion chamber 1 in FIG. 1. The combustion chamber 50 is of multi-part design, with an inner shell 26 encircling a turbine shaft 25. The wall structure 52 of the annular combustion chamber 50 has an outer shell 53 with two outer-shell parts 27 and 28 that have cooperating flange-like connecting regions (parting-plane flanges) 29 and 30, at which they are attached to one another. The internal space of the combustion chamber 50, through which the hot gases are guided, is indicated by broken lines. The annular combustion chamber 50 has, on its circumference, a plurality of combustion chamber inlets with burners in them, only two combustion chamber inlets 54 and 55, each with a burner 56 and 57, respectively, being shown for the sake of clarity.

Figure 7:
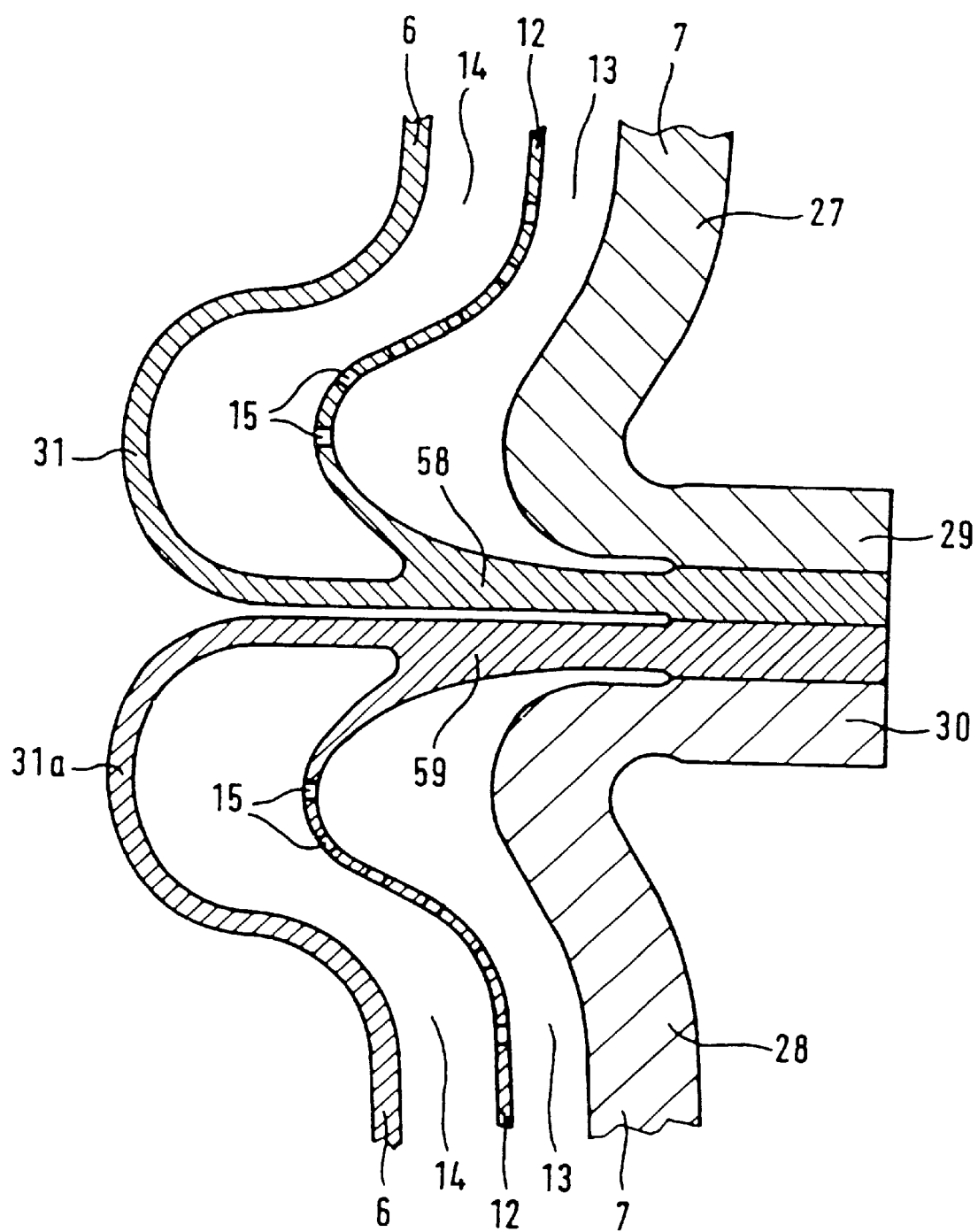
FIG. 7 is a sectional view taken along line VII—VII in FIG. 6.

FIG. 7 is a detailed sectional view taken at line VII—VII in FIG. 6, showing a region of the parting-plane area of the annular combustion chamber 50. The outer wall 7, the inner wall 6 and the intermediate wall 12 are bent in the vicinity of the connecting regions 29 and 30. The inner wall 6 and the intermediate wall 12 of each outer-shell 27,28 merge into a common wall 58,59 at the connecting parts 29 and 30. The common walls 58 and 59 and the outer walls 27 and 28 form the flange-like connecting regions 29 and 30. The connecting regions 29 and 30 are fastened to one another, preferably by screws or bolts (not shown). The walls have bent regions 31 and 31a to provide thermal elasticity and perform the same function as the bent regions 19 and 19a discussed above in connection with the combustion chamber 1 shown in FIG. 1. Accordingly, they resiliently absorb thermomechanical deformations and thus prevent damage caused by such loads.

The method of steam cooling according to the invention can be understood particularly in connection with FIG. 3. Cold cooling steam 11a is guided in the outer cooling space 13 and passes through orifices 15 located in the intermediate wall 12 into the inner cooling space, where it impacts against the inner wall 6 for impact cooling. The inner wall 6, heated by the hot gases 32, is thereby cooled. In such method, the cooling steam 11b heated-as a result of impact cooling is preferably discharged in the opposite direction to a direction of flow of the cold cooling steam 11a and in the opposite direction to a direction of flow of the hot gases 32 in the internal space 2. This type of circulation is designated the countercurrent principle.

It will be appreciated by those skilled in the art from the above description that the present invention is distinguished by a combustion chamber with a wall structure enclosing an internal space and having an inner wall exposed to a hot combustion gases and an outer wall. An intermediate wall with orifices is disposed in an envelope between the outer and inner walls, with an outer cooling space between the outer wall and the intermediate wall and an inner cooling space between the inner wall and the intermediate wall. Impact cooling of the inner wall is achieved with this structure.

Cooling fluid, in particular cooling steam, flows through inlet to the outer cooling space and spills over into the inner cooling space through the orifices in the intermediate wall. Those orifices are particulary designed for impact cooling the inner wall, that is, providing for the impact of the cooling steam against the side of the inner wall facing the inner cooling space and thus bringing about impact cooling of the inner wall. The cooling steam that has spilled over into the inner cooling space is discharged from the latter via an outlet. The cooling steam is guided in a closed circuit in a way that no cooling steam enters the internal combustion space and mixes with the hot gases therein. For this purpose, the inner wall is preferably designed to be impermeable to steam.

It is advantageous that in addition to existing convective cooling, in which heat exchange takes place between the inner wall and the cooling fluid flowing past it, the inner wall is cooled by impact cooling to ensure particularly high cooling effectiveness. As compared with the use of air as cooling fluid, the use of steam affords several advantages, one of which is that steam has a higher heat capacity than air and thus offers higher cooling effectiveness. As a result, the quantity of heat that must be discharged from the inner wall for cooling purposes is lower and, at the same time, the inner wall can be kept at a lower temperature, which may, for example, be 200° C. lower than with the use of cooling by air.

Owing to more effective cooling provided by the present invention, the combustion chamber internal space can operate at higher temperatures, while only slightly cooling the hot gases flowing through the combustion chamber, particularly because there is no intermixing of cooling steam and the hot combustion gases. Consequently, if the temperature of the hot gases is not reduced by the cooling arrangement, the temperature of the combustion flame, and the turbine inlet temperature, can be reduced. That has the effect of reducing the quantity of $NO_x$ compounds forming during combustion. Another advantage when cooling steam is used as cooling fluid is that compressor exit air does not have to be used for cooling the combustion chamber, so that the compressed air saved can be supplied for combustion and/or used for cooling other parts. Furthermore, with a closed cooling circuit, no cooling steam is lost and the pressure and temperature at which the cooling steam enters the outer cooling space via the inlet can in each case be set as desired. Moreover, the heat absorbed by the cooling steam can be recovered in further process steps.

It is also advantageous to place the inner cooling space outlet in the vicinity of the combustion chamber inlet. The cooling steam that has spilled over into the inner cooling space is thereby discharged in countercurrent to flow of the hot gases in the combustion chamber internal space. The temperature difference between the cooling steam in the inner cooling space and the hot gases in the combustion chamber remains virtually the same along the inner wall, thus leading to higher cooling effectiveness.

Investigations have shown that, in the case of a constant and homogeneous velocity distribution of a cooling fluid, in particular cooling steam, which flows along an inner wall to be cooled, heat can be transmitted at a very high heat flow density into the cooling fluid and discharged. With the present invention, the wall structure can be designed in such a way that both in the outer cooling space in an outer flow direction and in the inner cooling space in an inner flow direction, cooling steam is guided with a largely constant and homogeneous velocity distribution. To that end the invention includes the embodiment discussed above in which the outer cooling space has a variable outer cross-sectional flow area that is in a substantially constant first ratio to the sum of the areas of all of the intermediate wall orifices downstream of a given outer cross-sectional area. Furthermore, the inner cooling space has a variable inner cross-sectional flow area that is in a substantially constant second ratio to the sum of the areas of all of the intermediate wall orifices upstream of a given inner cross-sectional area. Preferably, the first and second ratios are substantially the same and have a value of about 0.08.

The cooling-steam velocity distribution in the outer cooling space and the inner cooling space is thereby essentially homogeneous and constant. As a result, heat can be transmitted from the inner wall with a high heat flow density of between 500 kW/m$^2$ and 900 kW/m$^2$ into the cooling steam and discharged. Furthermore, a heat flow density distribution of the heat transferred from the inner wall into the cooling steam is therefore largely homogeneous along the inner wall. This leads to a virtually homogeneous temperature distribution in the inner wall, thus ensuring low thermomechanical load on the inner wall and high cooling effectiveness. Moreover, the pressure difference between the cooling steam entering via the inlet and the cooling steam emerging from the outlet is very small, thus being equivalent to a low steam-flow pressure loss.

Preferably, the inner wall and/or the intermediate wall are mounted on the outer wall by elastic fastenings, so as to be thermally movable, thereby being capable of absorbing thermomechanical deformations. A resilient mounting will avoid inadmissible loads on the inner wall and/or the intermediate wall. The fastenings in a preferred embodiment are hangers, each of which includes a spring-loaded bolt rigidly fastened to the inner wall and elastically mounted to the outer wall at a steam-tight opening in the outer wall.

According to a further preferred embodiment, the inner wall and/or the intermediate wall are designed to be bent in the vicinity of the chamber inlet to absorb thermomechanical deformations. That is, deformation of the inner wall and/or of the intermediate wall is absorbed in the vicinity of the chamber inlet to avoid inadmissible loads on the inner wall and/or the intermediate wall.

According to another preferred embodiment, the wall structure has a cavity which surrounds the chamber outlet and is in fluid communication with the outer cooling space and inner cooling space, so that when the combustion chamber is used in a gas turbine, some of the cooling steam entering the outer cooling space enters the cavity and is discharged from the cavity into the inner cooling space. This provides for cooling of the wall structure at the chamber outlet.

Another cavity surrounding the chamber inlet is provided in the wall structure. This cavity is in fluid communication with the inner cooling space and has an outlet for the cooling fluid. In order to cool the wall structure in the region of the chamber inlet, the cooling steam that has spilled over into the inner cooling space is guided into this cavity and is discharged via the cavity outlet.

The side of the inner wall facing the combustion chamber internal space has a heat-insulating layer that protects the inner wall against thermal radiation given off by the hot combustion gases. If the inner wall is metal, the high combustion temperatures may cause oxidation on the internal side of the inner wall. On account of the effective cooling provided by the present invention, such oxidation can be markedly reduced, so that a diffusion or connecting layer for attaching the heat-insulating layer may be dispensed with. The heat-insulating layer may therefore be applied with the aid of a simple coating method, in particular atmospherically. In this way, the metallic inner wall can withstand high thermal radiation and extreme heat transmission coefficients of 700 W/(m²K) to 1,200 W/(m²K) on the hot-gas side.

In a further embodiment, webs providing serpentine-like flow paths are disposed in the inner and/or outer cooling spaces. The serpentine-like flow of the cooling steam gives rise, in addition to improved distribution of the cooling steam, to improved heat exchange between the inner wall and the cooling steam, along with accompanying improved cooling of the inner wall.

The present invention is applicable to an annular combustion chamber for a gas turbine. The wall structure of such a combustion chamber has an inner shell encircling a turbine shaft and a plurality of outer-shell parts jointly enclosing the inner shell. The annular combustion chamber is thereby simple to assemble. The wall structure of the outer-shell parts has flange-like connecting regions (parting-plane flanges), at which the outer-shell parts are fastened to one another and at which the inner wall and/or the intermediate wall are bent to absorb thermomechanical deformations.

According to the invention, a method for steam cooling a combustion chamber is achieved providing a combustion chamber with an inner wall for guiding hot combustion gases to which hot gas the inner wall is exposed on one side, and an intermediate wall having orifices through which cooling steam flows for impact cooling of the side of the inner wall facing away from the hot gases. The impact cooling of the inner wall brings about additional, particularly effective cooling, as compared with other cooling methods which can be or are used.

In the method, the cooling steam heated as a result of impact cooling and located between the inner wall and intermediate wall is preferably discharged in the opposite direction to the direction of flow of the hot gases in the combustion chamber. Moreover, the cooling steam supplied on that side of the intermediate wall facing an outer cooling space is supplied in the opposite direction with a flow of the cooling steam which is heated after impact cooling. This is designated as the countercurrent principle. Such cooling contributes to efficiently discharging heat from the inner wall, the heat being transferred into the cooling steam with a heat flow density of between 500 kW/m² and 900 kW/m².

Preferably, the cooling steam is supplied in such a way that it exerts on one side of the inner wall a pressure that corresponds approximately to the pressure exerted by the hot gases on the other side of the inner wall. As a result, the inner wall has low mechanical requirements, so that it can be made very thin, thereby improving cooling and reducing thermomechanical loads. Preferably, the cooling steam is guided in a closed system so that no steam passes into the internal space of the combustion chamber.

Combustion chambers as described herein are suitable for use in a gas-turbine plant, in particular in a gas turbine in which temperatures of the hot combustion gases are well above 1,200° C. When the hot gases are at a temperature which constitutes an inadmissible load on the basic material of a metallic inner wall, impact cooling of the side of the inner wall facing away from the hot gases using cooling steam can reduce the inner wall temperature to an acceptable level, in particular below 850° C.

Although preferred embodiments of the invention have been depicted and described, it will be understood that various modifications and changes can be made other than those specifically mentioned above without departing from the spirit and scope of the invention, which is defined solely by the claims that follow.

What is claimed is:

1. A combustion chamber comprising:
   a wall structure having an inner wall forming an internal space through which combustion gases flow from a chamber inlet to a chamber outlet and an outer wall, said inner wall and said outer wall defining an envelope therebetween;
   an intermediate wall disposed in said envelope and defining an inner cooling space between said inner wall and said intermediate wall and an outer cooling space between said intermediate wall and said outer wall; and
   a cooling fluid inlet in said outer space proximate to said chamber inlet and a cooling fluid outlet in said inner space proximate to said chamber inlet, wherein said intermediate wall has a plurality of orifices for permitting the flow of cooling fluid therethrough for impact cooling said inner wall.

2. A combustion chamber according to claim 1, wherein:
   said outer cooling space has an outer cooling space cross-sectional flow area that is variable along a direction of flow of cooling fluid, said outer cooling space cross-sectional flow area being in a substantially constant first ratio to the sum the areas of all of said orifices downstream of a given outer cooling space cross-sectional location;
   said inner cooling space has an inner cooling space cross-sectional flow area that is variable along a direction of flow of cooling fluid, said inner cooling space cross-sectional area being in a substantially constant second ratio to the sum the areas of all of said orifices upstream of a given inner cooling space cross-sectional location; and
   said first and second ratios are substantially the same.

3. A combustion chamber according to claim 2, wherein said first and second ratios are about 0.08.

4. A combustion chamber according to claim 1, wherein said inner wall and said intermediate wall are mounted on said outer wall by a plurality of elastic fastenings.

5. A combustion chamber according to claim 4, wherein each said fastening comprises:
   a bolt extending through an opening in said outer wall, said bolt being rigidly fastened to said inner wall;
   a connector elastically attaching said bolt to said outer wall; and
   a seal for providing a fluid-tight seal between sealing said bolt and said opening.

6. A combustion chamber according to claim 1, wherein said inner wall has a thickness of between 4.0 mm and 8.0 mm.

7. A combustion chamber according to claim 1, wherein at least one of said inner wall and said intermediate wall has a bent portion proximate to said chamber inlet for absorbing thermomechanical deformations.

8. A combustion chamber according to claim 7, wherein said inner wall and said intermediate wall each have a bent portion proximate to said chamber inlet for absorbing thermomechanical deformations.

9. A combustion chamber according to claim 1, wherein said wall structure includes a cavity surrounding said chamber outlet, said cavity being in fluid communication with said outer cooling space and said inner cooling space.

10. A combustion chamber according to claim 1, wherein said wall structure includes a cavity surrounding said chamber inlet, said cavity having an inlet in fluid communication with said inner cooling space outlet and having a cavity outlet for cooling fluid.

11. A combustion chamber according to claim 1, further comprising a heat insulating layer on an inner surface of said inner wall.

12. A combustion chamber according to claim 1, wherein said combustion chamber is an annular combustion chamber for a gas turbine.

13. A combustion chamber according to claim 12, further comprising an inner shell encircling a turbine shaft and a plurality of outer-shell parts enclosing said inner shell.

14. A combustion chamber according to claim 13, wherein said outer-shell parts include flange-like connecting regions for connecting said outer-shell parts together, and at least one of said inner wall and said intermediate wall has a bent portion proximate to said flange-like portions for absorbing thermomechanical deformations.

15. A combustion chamber according to claim 14, wherein said inner wall and said intermediate wall each have a bent portion proximate to said flange-like portions for absorbing thermomechanical deformations.

16. A method for steam cooling a combustion chamber having an inner wall for exposure on one side thereof to combustion gases flowing through said chamber, said method comprising the steps of:

providing an intermediate wall between said inner wall and an outer wall to form an outer cooling space bounded by said intermediate wall and said outer wall and an inner cooling space bounded by said intermediate wall and said outer wall, said intermediate wall having therein a plurality of orifices;

flowing cooling steam in said outer space in a direction generally the same as a direction of flow of said combustion gases and at a substantially constant velocity in at least a portion of said outer space;

flowing the cooling steam in said inner space in a direction generally opposite to a direction of flow of said combustion gases and at a substantially constant velocity in at least a portion of said inner space; and passing the cooling steam through said orifices and impacting said steam against another side of inner wall facing away from the combustion gases.

17. A method according to claim 15, wherein the cooling steam exerts on said inner wall a pressure that approximates a pressure exerted by the combustion gases on said inner wall.

18. A method according to either one of claims 16 and 17, wherein the cooling steam does not pass through said inner wall.

19. A combustion chamber according to claim 1, wherein said inner wall is imperforate.

20. A combustion chamber according to claim 1, wherein said outer wall mechanically supports said combustion chamber.

* * * * *